US010768068B2

(12) United States Patent
Martin et al.

(10) Patent No.: US 10,768,068 B2
(45) Date of Patent: Sep. 8, 2020

(54) PRESSURE SCANNER ASSEMBLIES HAVING REPLACEABLE SENSOR PLATES

(71) Applicant: KULITE SEMICONDUCTOR PRODUCTS, INC., Leonia, NJ (US)

(72) Inventors: Richard Martin, Ridgewood, NJ (US); Louis DeRosa, Wayne, NJ (US); Joseph R. VanDeWeert, Maywood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 285 days.

(21) Appl. No.: 15/187,239

(22) Filed: Jun. 20, 2016

(65) Prior Publication Data

US 2016/0313202 A1 Oct. 27, 2016

Related U.S. Application Data

(63) Continuation of application No. 13/184,613, filed on Jul. 18, 2011, now Pat. No. 9,372,131.

(Continued)

(51) Int. Cl.
| | | |
|---|---|---|
| *G06F 19/00* | (2018.01) | |
| *G01L 15/00* | (2006.01) | |
| *G01L 9/00* | (2006.01) | |

(52) U.S. Cl.
CPC ............ *G01L 15/00* (2013.01); *G01L 9/0052* (2013.01)

(58) Field of Classification Search
None
See application file for complete search history.

(56) References Cited

U.S. PATENT DOCUMENTS

| 3,930,412 A | 1/1976 | Mallon et al. |
| 4,111,058 A | 9/1978 | Gross |

(Continued)

FOREIGN PATENT DOCUMENTS

| GB | 2411960 | 9/2005 |
| JP | 2007-204006 A | 8/2007 |

OTHER PUBLICATIONS

International Search Report and Written Opinion dated Oct. 26, 2012 issued by the European Patent Office for related PCT Patent Application No. PCT/US2011/044066.

(Continued)

*Primary Examiner* — Ruihua Zhang
(74) *Attorney, Agent, or Firm* — Troutman Sanders LLP; James E. Schutz; Christopher C. Close, Jr.

(57) ABSTRACT

A pressure scanner assembly having at least one replaceable sensor plate, wherein each of the replaceable sensor plates has at least one pressure sensor adapted to transmit a signal substantially indicative of a sensed pressure condition. A memory chip, which stores correction coefficients for each of the pressure sensor to compensate for thermal errors, may be installed on each of the replaceable sensor plates. The signals from the pressure sensors are multiplexed and may be outputted in analog or digital form. The pressure scanner assemblies described herein have sensor plates that can be interchanged with other sensor plates of the same or different pressure range without disrupting the electronic configuration of the pressure scanner assembly or having to recalibrate and/or update the memory chip installed thereon.

13 Claims, 3 Drawing Sheets

Related U.S. Application Data

(60) Provisional application No. 61/365,231, filed on Jul. 16, 2010.

(56) References Cited

U.S. PATENT DOCUMENTS

| | | | |
|---|---|---|---|
| 4,442,716 A | 4/1984 | Coe et al. | |
| 4,483,178 A * | 11/1984 | Mille | G01L 15/00 |
| | | | 73/708 |
| 4,598,381 A | 7/1986 | Cucci | |
| 4,753,105 A * | 6/1988 | Juanarena | G01L 27/00 |
| | | | 73/4 R |
| 5,070,732 A | 12/1991 | Duncan et al. | |
| 5,406,036 A | 4/1995 | Haug | |
| 5,501,231 A * | 3/1996 | Kaish | A61B 5/087 |
| | | | 600/484 |
| 5,790,422 A | 4/1998 | Power et al. | |
| 6,035,240 A | 3/2000 | Moorehead et al. | |
| 6,139,361 A * | 10/2000 | Przilas | H05K 7/20345 |
| | | | 439/559 |
| 6,247,369 B1 | 1/2001 | Chapman et al. | |
| 8,061,213 B2 | 11/2011 | Kurtz et al. | |
| 2004/0230352 A1 | 11/2004 | Monroe | |
| 2006/0001761 A1 | 1/2006 | Haba et al. | |
| 2006/0177956 A1 | 8/2006 | O'Brien et al. | |
| 2006/0272383 A1 | 12/2006 | Huang et al. | |
| 2007/0180901 A1 * | 8/2007 | Katou | B60C 23/0408 |
| | | | 73/146.2 |
| 2007/0235231 A1 | 10/2007 | Loomis et al. | |
| 2008/0107151 A1 | 5/2008 | Khadkikar et al. | |
| 2009/0116167 A1 | 5/2009 | Stevenson et al. | |
| 2009/0288484 A1 | 11/2009 | Selvan et al. | |
| 2010/0185403 A1 | 7/2010 | Kurtz et al. | |
| 2011/0057707 A1 * | 3/2011 | Bronczyk | G01R 31/025 |
| | | | 327/332 |
| 2011/0283803 A1* | 11/2011 | Kurtz | G01L 9/0054 |
| | | | 73/727 |
| 2012/0029847 A1* | 2/2012 | Kurtz | G01L 15/00 |
| | | | 702/50 |
| 2012/0166124 A1* | 6/2012 | Grudin | G01D 18/00 |
| | | | 702/98 |

OTHER PUBLICATIONS

JP2013-519838 Notice of Refusal, dated Feb. 24, 2015.

\* cited by examiner

PRESSURE SCANNER ASSEMBLIES HAVING REPLACEABLE SENSOR PLATES

CROSS-REFERENCE TO RELATED APPLICATIONS

This application is a continuation of and claims priority under 35 U.S.C. 120 to U.S. patent application Ser. No. 13/184,613, which was filed on Jul. 18, 2011. U.S. patent application Ser. No. 13/184,613 claims the benefit of U.S. Provisional Patent Application No. 61/365,231, which was filed on Jul. 16, 2010. The entire contents and substance of each of these applications are hereby incorporated by reference in their entirety as if fully set forth herein.

BACKGROUND

Pressure scanner assemblies are high accuracy, low-cost devices that incorporate and combine many pressure sensors (e.g., 8, 16, 32, 64, etc.) having wide pressure ranges into one small box. More specifically, the pressure sensors are housed in various sensor plates that correspondingly fit within the small box of the pressure scanner assembly. Each pressure sensor is configured to measure pressure of an applied pressure source and subsequently produce an output indicative of that pressure. This output is then transmitted via an electrical connector to a data logging system. This output can be in analog or digital form.

The data from the pressure scanner assembly must then be correlated to actual pressure readings. The gain and offset for each sensor must be used to convert from raw voltage to a pressure reading. In most pressure scanner assemblies, the output data must also be corrected to compensate for thermal errors. This is typically done by manually entering correlation and correction coefficients into a data acquisition system, which can be time consuming. Alternatively, a memory chip storing correction coefficients can be embedded into the pressure scanner assembly, however the memory chip must be updated and/or recalibrated each time a pressure sensor malfunctions and is replaced.

In many embodiments, the sensor plates are built into the pressure scanner assembly and thus, cannot be easily replaced by the user. Instead, the user must send the pressure scanner assembly back to the manufacturer to replace the necessary sensor plates or individual sensors, which can be time consuming and costly. In other embodiments, pressure sensors are attached to a removable sensor plate so that, if needed, a sensor plate having working pressure sensors can replace a sensor plate with damaged pressure sensors. These embodiments, however, require that the replacement pressure sensors are of the same pressure range and/or have similar correction coefficients. Therefore, if a sensor plate configured to operate under different pressure parameters is used as the replacement sensor plate, it will adversely interfere with the electronics of the overall pressure scanner assembly.

Because of these limitations, there is a need for a pressure scanner that has replaceable sensor plates, wherein the sensor plates can be interchanged with other sensor plates of the same or different pressure ranges without disrupting the electronic configuration of the pressure scanner assembly or having to recalibrate and/or update the memory chip installed thereon.

BRIEF SUMMARY

The various embodiments of the present invention provide pressure scanner assemblies that comprise at least one replaceable sensor plate, wherein each of the replaceable sensor plates has at least one pressure sensor that transmits a signal substantially indicative of a sensed pressure condition. The pressure scanner assemblies further comprise a memory chip installed on each of the replaceable sensor plates, wherein the memory chip stores correction coefficients for each of the pressure sensors on the corresponding replaceable sensor plate.

In some embodiments, the pressure scanner assemblies may further comprise at least one multiplexer installed on each of the replaceable sensor plates, wherein each of the multiplexers are configured to receive the signals indicative of the sensed pressure condition from each of the pressure sensors on the corresponding replaceable sensor plate and transmit a final output.

Further, some embodiments include at least one multiplexing line in electrical communication with each of the multiplexers, wherein each of the multiplexing lines are configured to select signals and correction coefficients to be transmitted in the final output, wherein the final output may be in analog or digital form.

More specifically, analog pressure scanner assembly embodiments may comprise at least one replaceable sensor plate, wherein each of the replaceable sensor plates has at least one pressure sensor that transmits a signal substantially indicative of a sensed pressure condition; a memory chip installed on each of the replaceable sensor plates, wherein the memory chip stores correction coefficients for each of the pressure sensors on the corresponding replaceable sensor plate; and at least one multiplexer installed on each of the replaceable sensor plates configured to receive the signals from each of the pressure sensors on the corresponding replaceable sensor plate and transmit a final analog output.

The analog pressure scanner assembly may further comprise at least one multiplexing line in electrical communication with each of the multiplexers, wherein each of the multiplexing lines are configured to select signals and correction coefficients to be transmitted in the final output.

Even further, digital pressure scanner assembly embodiments may comprise at least one replaceable sensor plate, wherein each of the replaceable sensor plates has at least one pressure sensor that transmits an analog signal substantially indicative of a sensed pressure condition; a memory chip installed on each of the replaceable sensor plates, wherein the memory chip stores correction coefficients for each of the pressure sensors on the corresponding replaceable sensor plate; at least one multiplexer installed on each of the replaceable sensor plates configured to receive the analog signals from each of the pressure sensors; and at least one analog to digital converter installed on each of the replaceable sensor plates, wherein the analog to digital converter is in electrical communication with the multiplexer on the corresponding replaceable sensor plate and converts the analog signals into digital signals.

In this embodiment, each analog to digital converter controls the multiplexer on the corresponding replaceable sensor plate and selects the digital signals and correction coefficients to be transmitted in a final digital output. Some digital pressure scanner assembly embodiments may further comprise a central microprocessor adapted to receive the final digital output from each analog to digital converter.

DETAILED DESCRIPTION

Figure 1:
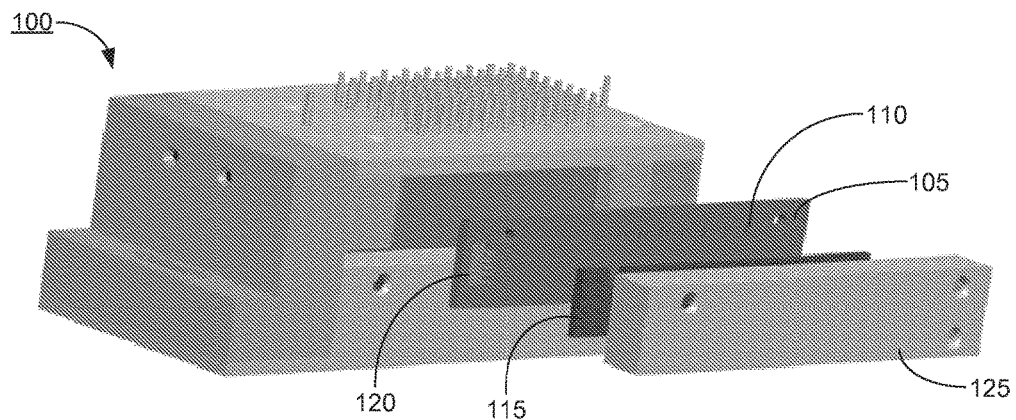
FIG. 1 illustrates an embodiment of a pressure scanner assembly in accordance with exemplary embodiments of the present invention.

Although preferred embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, another embodiment includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Referring now to the drawings, in which like numerals represent like elements, exemplary embodiments of the present invention are herein described. It is to be understood that the figures and descriptions of the present invention have been simplified to illustrate elements that are relevant for a clear understanding of the present invention, while eliminating, for purposes of clarity, many other elements found in typical pressure scanner assembly and methods of making and using the same. Those of ordinary skill in the art will recognize that other elements are desirable and/or required in order to implement the present invention. However, because such elements are well known in the art, and because they do not facilitate a better understanding of the present invention, a discussion of such elements is not provided herein.

Exemplary embodiments of the present invention provide pressure scanner assemblies that comprise at least one replaceable sensor plate. Each sensor plate comprises at least one pressure sensor that measures an applied pressure and transmits an output signal substantially indicative of the applied pressure. The pressure scanner assembly may further comprise a memory chip installed on each of the replaceable sensor plates, wherein the memory chip stores correction coefficients for each of the pressure sensors on the corresponding sensor plate.

An exemplary embodiment of a pressure scanner assembly 100 is illustrated in FIG. 1. The pressure scanner assembly 100 comprises at least one sensor plate 105. One skilled in the art will appreciate that the pressure scanner assembly may comprise more than one sensor plate 105, for example but not limited to, two or four sensor plates.

The sensor plates 105 are configured to fit within the main body of the pressure scanner assembly 100 and may be easily removed and replaced by a user, therefore allowing the user to easily swap sensor plates 105 to manipulate the pressure sensing range and/or replace a damaged sensor plate 105 (or one that requires routine maintenance) with a sensor plate that works properly. This configuration provides great benefits to a user as the user can quickly replace one or more sensor plates 105 and continue use of the pressure scanner assembly 100 without incurring substantial costs or long periods of downtime. The sensor plates 105 can be made of many materials and can be of many dimensions, for example but not limited to, about 0.5 inches by 2.5 inches.

Each sensor plate 105 comprises at least one pressure sensor 110. One skilled in the art, however, will appreciate that each sensor plate 105 may have more than one pressure sensor 110, for example but not limited to, eight sensors or sixteen sensors. The pressure sensors 110 measure an applied pressure and output a signal substantially indicative of the applied pressure. The pressure sensors 110 can be, for example but not limited to, piezoresistive pressure sensors. The pressure sensors 110 may be configured to measure the same pressure range; contrastingly, the pressure sensors 110 may be configured to measure different pressure ranges. This broad pressure range capacity enables the pressure scanner assembly 100 to scan and switch between multiple pressure ranges, which increases the throughput and productivity of the pressure scanner assembly 100.

As illustrated in FIG. 1, each sensor 110 may be connected to an electronics board 115. The electronics board 115 may comprise various electronic devices, for example but not limited to, multiplexers, memory chips, and/or analog to digital converters, as required by the embodiments, which are further described herein. The pressure scanner assembly 100 may also comprise a cover 125 configured to seal the pressure sensors 110, and the electronics board 115 into a closed cavity created between the cover and the sensor plate. In this way, the top of the sensor plate 105 remains sealed from external environments, therefore allowing the reference pressure to be applied to and accurately measured by the pressure sensors 110. Further the electronics board 115 connects to the main body of the pressure scanner assembly 100 via a hermetic connector. This connector allows the electrical signals to pass out while maintaining the sealed cavity.

Figure 2:
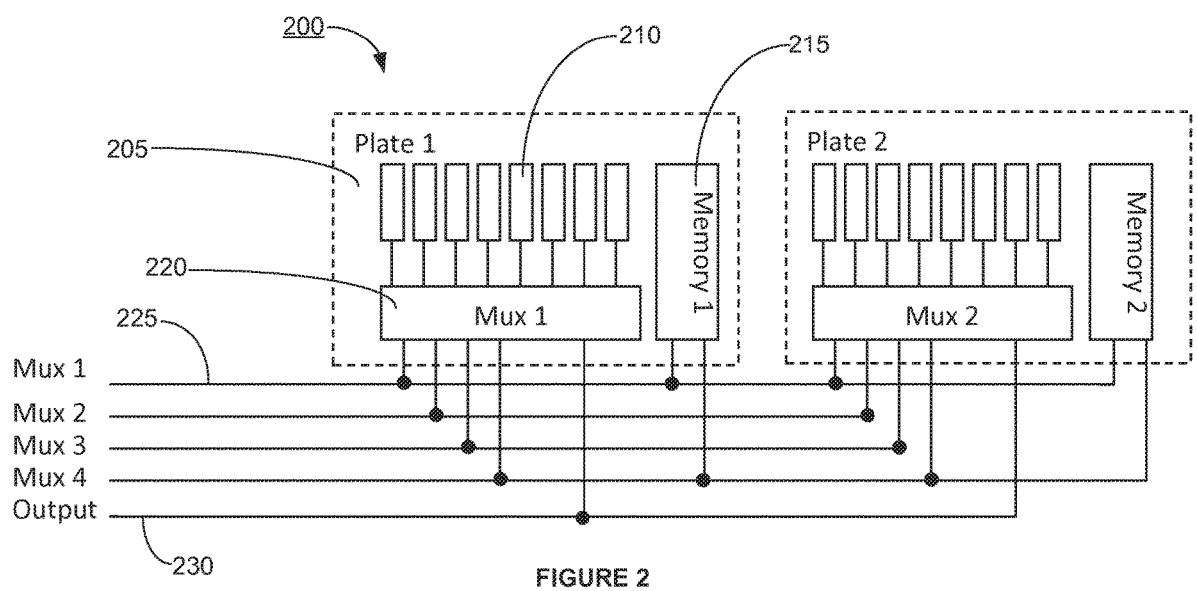
FIG. 2 illustrates an embodiment of an analog pressure scanner assembly in accordance with exemplary embodiments of the present invention.

The pressure scanner assembly 100 of the present invention may be configured to output in analog or digital form. FIG. 2 provides an illustration of an analog pressure scanner assembly 200 in accordance with exemplary embodiments of the present invention. The analog pressure scanner assembly 200 comprises at least one sensor plate 205. As described above, each sensor plate 205 may comprise a plurality of pressure sensors 210, wherein the pressure sensors 210 are configured to measure an applied pressure and output a signal substantially proportional to the applied pressure. The sensor plates 200 are replaceable and may be replaced with sensor plates of the same or different pressure ranges. The analog pressure scanner assembly 200 further comprises a memory chip 215 installed on each sensor plate 205. The memory chip 215 comprises coefficients for each pressure sensor 210 on the corresponding sensor plate 205 to correct for thermal errors and other errors commonly associated with each individual pressure sensor 210, and further correlates the pressure signals to actual pressure readings. Therefore, because each sensor plate 205 has a memory chip 215 unique to each individual pressure sensor 210 installed on the corresponding sensor plate 205, the sensor plates 205 may be easily swapped and replaced without having to recalibrate the analog pressure scanner assembly 200 or manually update the memory chip 215.

The analog pressure scanner assembly 200 further comprises at least one multiplexer 220 installed on each of the sensor plates 205 and at least one multiplexing line 225 in electrical communication with each multiplexer. It shall be understood that each sensor plate 205 may comprise a plurality of multiplexers 220 and further, the analog pressure scanner assembly 200 may comprises a plurality of multiplexing lines 225. The multiplexers 220 receive pressure signals from each of the pressure sensors 210 installed on the corresponding sensor plate 205. The multiplexing lines 225 electrically communicate with the multiplexers 220 installed on each of the sensor plates 205 and use binary addressing to select which of the pressure sensor signals will be outputted via an output line 230. In an exemplary embodiment, the output is an analog output. The multiplexing lines 225 also use binary addressing to select the appropriate memory chip 215 and correction coefficients that correspond to the selected pressure sensor signals. This communication may be done over one multiplexing line or, alternatively, multiple multiplexing lines. Further an analog amplifier may be situated after the multiplexers either on each individual sensor plate or on the main scanner assembly.

Figure 3:
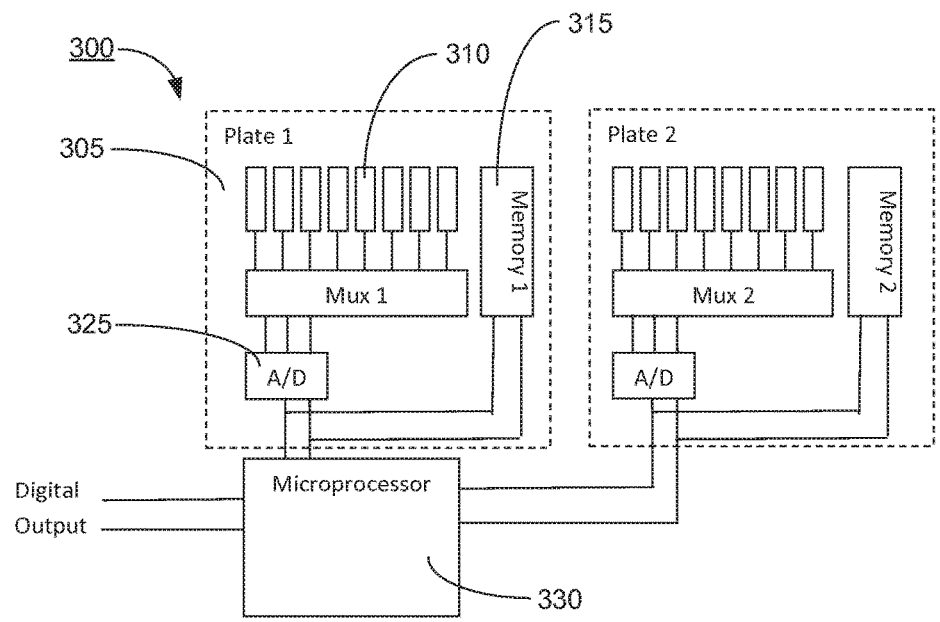
FIG. 3 illustrates an embodiment of a digital pressure scanner assembly in accordance with exemplary embodiments of the present invention.
Figure 4:
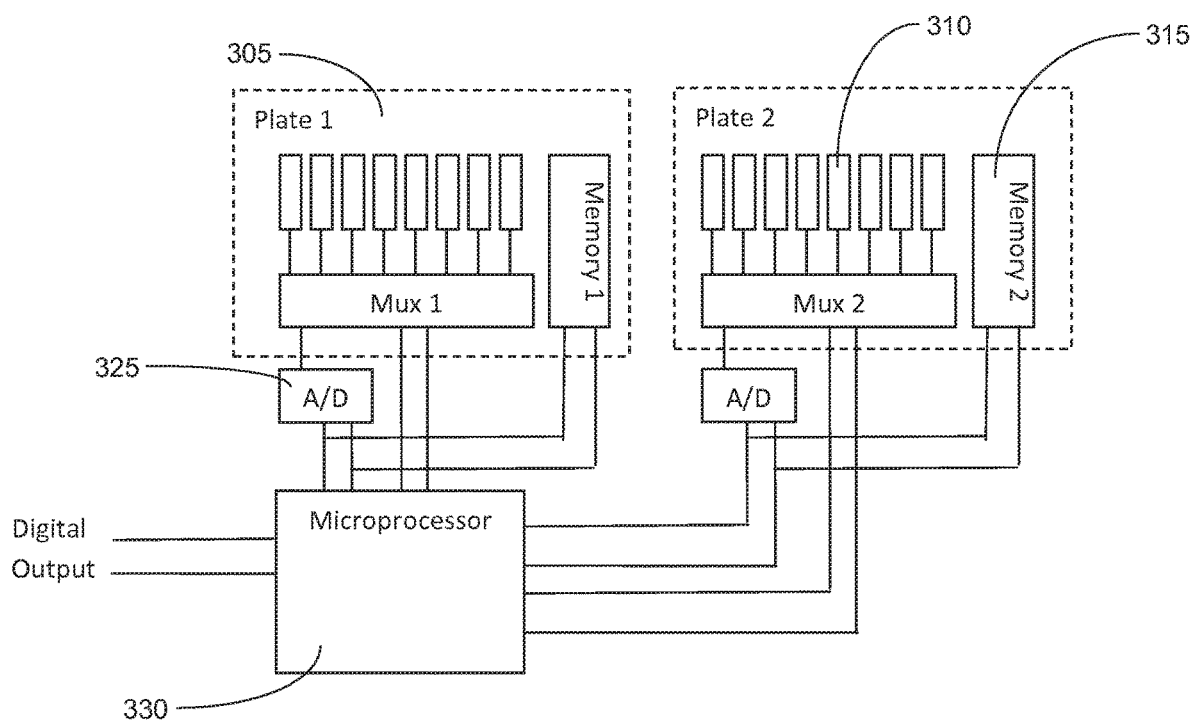
FIG. 4 illustrates exemplary embodiment of a digital pressure scanner assembly in accordance with exemplary embodiments of the present invention.

FIGS. 3 and 4 provide illustrations of digital pressure scanner assemblies 300 in accordance with exemplary embodiments of the present invention. Like the analog pressure scanner assembly 200, described above, the digital pressure scanner assembly 300 also comprises replaceable sensor plates 305, wherein each sensor plate 305 comprises pressure sensors 310, a memory chip 315, and a multiplexer 320. The digital pressure scanner assembly 300, however, further comprises an analog to digital converter (A/D) 325. In some embodiments, the A/D 325 may be installed on the sensor plate 305 to save space, as illustrated in FIG. 3. In other embodiments, the A/D 325 may be installed within the digital pressure scanner assembly 300 but independent from the sensor plate 305, as illustrated in FIG. 4, which reduces the cost and size of the sensor plates 305. In both embodiments, the A/D 325 controls the multiplexers 320 and, like the multiplexing lines 225 in the analog pressure scanner assembly 200, selects which pressure sensor signal will be outputted. The A/D 325 then converts the analog data from the selected pressure sensor signals into digital signals and passes the data to a central microprocessor 330 located within the body of the digital pressure scanner assembly 300. The microprocessor 330 then reads the memory chips 315 installed on each of the sensor plates 305 and uses the corresponding correction coefficients to interpret the digital data for each selected pressure sensor 310. The communication between the microprocessor 330 and the memory chip 315 may be carried out over the same digital lines as the A/D 325 or over separate lines. It is also understood that the microprocessor may control the multiplexer directly through separate output control lines.

It shall be understood that each sensor plate 305 may hold one or more A/Ds 325 depending on the number of pressure sensors 310 installed on the sensor plates 305 and the data rates needed. Having the A/Ds 325 installed on each of the sensor plates 305 allows the A/D 325 and the pressure sensors 315 to be in close proximity, which results in higher noise immunity. Further, it also eliminates analog signals from passing through mechanical connectors otherwise disposed between the A/D 325 and pressure sensors 310, which also results in higher noise immunity. The digital pressure scanner assembly 300 may further comprise an amplifier on each sensor plate 305 disposed between the multiplexer 320 and the A/D 325 to create higher level signals for the A/D 325 to measure.

As described, both analog pressure scanner assembly 200 embodiments and digital pressure scanner assembly 300 embodiments comprise memory chips 215/315 installed on the sensor plates 205/305. This configuration enables pressure sensors of many different pressure ranges to be easily added to the pressure scanner assembly without having to do extensive recalibrations or enter new data points. In this way, a single pressure scanner assembly, for example, may accurately measure 5 PSI differential, 15 PSI absolute, and 100 PSI absolute pressure ranges at the same time.

Figure 5:
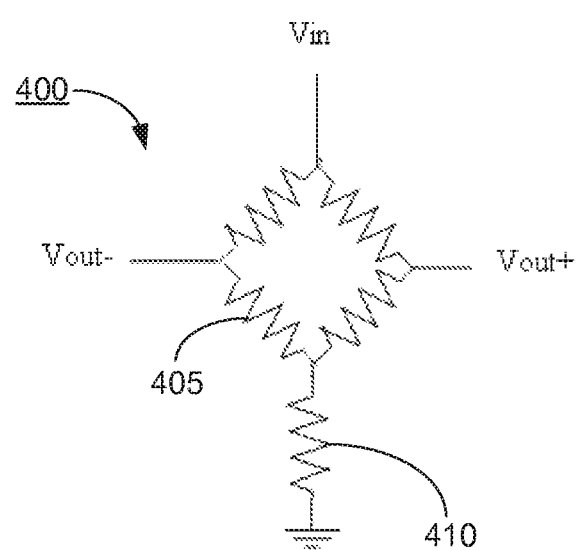
FIG. 5 illustrates an embodiment of a piezoresistive pressure sensor able to measure both temperature and applied pressure.

Another advantage of the present invention is that the unique configuration of multiplexers may allow for the measurement of the sensor temperature as well as the pressure using the same measurement system. As an example, FIG. 5 illustrates an embodiment of a piezoresistive pressure sensor 400 able to measure both temperature and applied pressure. In the case of the analog output scanner, the multiplexers can be configured to have a separate input that allows for measurements of each side of the piezoresistive bridge 405 rather than the difference between them. Those skilled in the art will appreciate that by averaging these two common mode measurements, a value of the resistance of the piezoresistive bridge can be calculated provided that there is a fixed span resistor 410 in series with the bridge 405. Since the resistance of the bridge is proportional to bridge temperature this value can be used to calculate the bridge temperature. In the same way in the digital output scanner the same A/Ds used to measure pressure can be used to measure temperature. This temperature data can then be used either with the internal microprocessor or an external system along with the correction coefficients stored in the memory to accurately calculate the pressure over the entire temperature range.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A pressure scanner assembly comprising:
a plurality of replaceable plates, each replaceable plate of the plurality of replaceable plates comprising a surface, the surface having disposed thereon:
   a plurality of sensors configured to obtain data indicative of two environmental conditions in an environment, each sensor of the plurality of sensors configured to obtain data indicative of a first environmental condition of the two environmental conditions within a first range and a second environmental condition of the two environmental conditions within a second range;
   a multiplexer in electrical communication with each of the plurality of sensors, and configured to use binary addressing to select data indicative of an environmental condition from a particular sensor in the plurality of sensors;
   an analog-to-digital converter in electrical communication with the multiplexer and configured to (i) receive, from the multiplexer, the selected data indicative of the environmental condition and (ii) convert the selected data indicative of the environmental condition to a digital signal indicative of pressure sensor data;
   a memory chip configured to store a plurality of coefficients, each coefficient corresponding to a particular sensor of the plurality of sensors, and each coefficient configured to (i) correct errors associated with its respective sensor and (ii) correlate data indicative of an environmental condition, as measured by its respective sensor, by using gain and offset particular to the respective sensor to convert the data indicative of the environmental condition, as measured by its respective sensor, to actual environmental condition readings; and
a central processor located within the pressure scanner assembly and configured to (i) receive, from each analog-to-digital converter, selected pressure sensor data indicative of an environmental condition as obtained by a particular sensor of the plurality of sensors on a particular replaceable plate, and (ii) retrieve, from the memory chip on the particular replaceable plate, a correction coefficient corresponding to the particular sensor.

2. The replaceable plate pressure scanner assembly of claim 1, further comprising a cover configured to create a closed cavity between an interior of the cover and the surfaces of the plurality of replaceable plates, the closed cavity sealed from external environments.

3. The pressure scanner assembly of claim 2, wherein each of the replaceable plates of the plurality of replaceable plates further comprises a hermetic connector configured to transmit the selected data indicative of the environmental condition and the coefficient corresponding to the particular sensor to the processor while maintaining the closed cavity.

4. The pressure scanner assembly of claim 1, wherein each of the replaceable plates of the plurality of replaceable plates further has disposed thereon an amplifier in electrical communication with the multiplexer and the analog-to-digital converter that is configured to (i) receive, from the multiplexer, the selected data indicative of the environmental condition, (ii) scale the selected data indicative of the environmental condition to generate a scaled signal, and (iii) output, to the analog-to-digital converter, the scaled signal.

5. A system comprising:
a cover having an interior; and
a plurality of replaceable plates each having a surface, each respective surface of the plurality of replaceable plates having disposed thereon:
   a plurality of sensors configured to obtain data indicative of two environmental conditions in an environment, each sensor of the plurality of sensors configured to obtain data indicative of a first environmental condition of the two environmental conditions within a first range and a second environmental condition of the two environmental conditions within a second range;
   a multiplexer in electrical communication with each of the plurality of sensors, and configured to use binary addressing to select data indicative of an environmental condition from a particular sensor in the plurality of sensors;
   an analog-to-digital converter in electrical communication with the multiplexer and configured to (i) receive, from the multiplexer, the selected data indicative of the environmental condition and (ii) convert the selected data indicative of the environmental condition to a digital signal indicative of pressure sensor data;
   a memory chip configured to store a plurality of coefficients, each coefficient corresponding to a particular sensor of the plurality of sensors, and each coefficient configured to (i) correct errors associated with its respective sensor and (ii) correlate data indicative of an environmental condition, as measured by its respective sensor, by using gain and offset particular to the respective sensor to convert the data indicative of the environmental condition, as measured by its respective sensor, to actual environmental condition readings;
   a hermetic connector in electrical communication with the analog-to-digital converter and the memory chip, the hermetic connector configured for transmitting the selected data indicative of the environmental condition from the particular sensor and the coefficient corresponding to the particular sensor; and
a central processor located within the pressure scanner assembly and in electrical communication with each hermetic connector, the processor configured to (i) receive, from an analog-to-digital converter of a particular replaceable plate via the hermetic connector of the particular replaceable plate, selected pressure sensor data indicative of an environmental condition as obtained by a particular sensor on the particular replaceable plate, and (ii) retrieve, from the memory chip on the particular replaceable plate via the hermetic connector of the particular replaceable plate, a correction coefficient corresponding to the particular sensor,
wherein the cover is configured to create a closed cavity between the interior of the cover and the surfaces of the plurality of replaceable plates, the closed cavity sealed from external environments, and
wherein the hermetic connector allows for transmitting the selected data indicative of the environmental condition and the coefficient corresponding to the particular sensor to the processor while maintaining the closed cavity.

6. The system of claim 5, the surface of each of the replaceable plates further having disposed thereon an amplifier in electrical communication with the multiplexer and the analog-to-digital converter and configured to (i) receive, from the multiplexer, the selected data indicative of the environmental condition, (ii) scale the selected data indicative of the environmental condition to generate a scaled signal, and (iii) output, to the analog-to-digital converter, the scaled signal.

7. A system comprising:
a first replaceable plate having a first surface, the first surface having disposed thereon:
  a first plurality of sensors configured to obtain data indicative of an environmental condition in an environment within a first range, each sensor of the first plurality of sensors configured to obtain data indicative of the environmental condition within respective ranges of a first respective range;
  a first multiplexer in electrical communication with each of the first plurality of sensors, and configured to use binary addressing to select data indicative of an environmental condition from a particular sensor in the first plurality of sensors;
  a first analog-to-digital converter, the first analog-to-digital converter in electrical communication with the first multiplexer and configured to (i) receive, from the first multiplexer, the selected data indicative of the environmental condition and (ii) convert the selected data indicative of the environmental condition to a digital signal indicative of pressure sensor data;
  a first memory chip configured to store a plurality of coefficients, each coefficient corresponding to a respective sensor of the first plurality of sensors, and each coefficient configured to (i) correct errors associated with its respective sensor and (ii) correlate data indicative of an environmental condition, as measured by its respective sensor, by using gain and offset particular to the respective sensor to convert the data indicative of the environmental condition, as measured by its respective sensor, to actual environmental condition readings; and
a second replaceable plate having a second surface, the second surface having disposed thereon:
  a second plurality of sensors configured to obtain data indicative of an environmental condition in an environment within a second range, each sensor of the second plurality of sensors configured to obtain data indicative of the environmental condition within respective ranges of a second respective range;
  a second multiplexer in electrical communication with each of the second plurality of sensors, and configured to use binary addressing to select data indicative of an environmental condition from a particular sensor in the second plurality of sensors;
  a second analog-to-digital converter, the second analog-to-digital converter in electrical communication with the second multiplexer and configured to (i) receive, from the second multiplexer, the selected data indicative of the environmental condition and (ii) convert the selected data indicative of the environmental condition to a digital signal indicative of pressure sensor data;
  a second memory chip configured to store a plurality of coefficients, each coefficient corresponding to a respective sensor of the second plurality of sensors, and each coefficient configured to (i) correct errors associated with its respective sensor and (ii) correlate data indicative of an environmental condition, as measured by its respective sensor, by using gain and offset particular to the respective sensor to convert the data indicative of the environmental condition, as measured by its respective sensor, to actual environmental condition readings; and
a central processor in electrical communication with the first and second analog-to-digital converters and the first and second memory chips, the processor configured to (i) receive, from an analog-to-digital converter of the first or second replaceable plates, selected pressure sensor data indicative of an environmental condition as obtained by a particular sensor on the respective first or second replaceable plate, and (ii) retrieve, from a memory chip on the respective first or second replaceable plate, a correction coefficient corresponding to the particular sensor.

8. The system of claim 7, further comprising a cover configured to create a closed cavity between the respective first surface or second surface and an interior of the cover, the closed cavity sealed from external environments.

9. The system of claim 8, further comprising:
  a first hermetic connector for transmitting, from the first replaceable plate and to the processor, the selected data indicative of the environmental condition and the coefficient corresponding to the particular sensor; and
  a second hermetic connector for transmitting, from the second replaceable plate and to the processor, the selected data indicative of the environmental condition and the coefficient corresponding to the particular sensor,
  wherein when the cover creates the closed cavity, the first and second hermetic connectors allow for transmitting the selected data from the first and second replaceable plates indicative of the environmental condition and the coefficient corresponding to the particular sensor to the processor while maintaining the closed cavity.

10. The system of claim 9, the first replaceable plate and the second replaceable plate further having disposed thereon an amplifier, each amplifier in electrical communication with the respective multiplexer and the respective analog-to-digital converter and configured to (i) receive, from the multiplexer, the selected data indicative of the environmental condition, (ii) scale the selected data indicative of the environmental condition to generate a scaled signal, and (iii) output, to the respective analog-to-digital converter, the scaled signal.

11. The system of claim 10, wherein the first multiplexer and the first analog-to-digital converter disposed on the first replaceable plate are combined into a single unit and the second multiplexer and the second analog-to-digital converter disposed on the second replaceable plate are combined into a single unit.

12. The system of claim 7, wherein the environmental condition is one of pressure and temperature.

13. The system of claim 7, wherein the first plurality of sensors and the second plurality of sensors each comprise one or more piezoresistive sensors.

* * * * *